United States Patent
Li et al.

(10) Patent No.: US 10,080,235 B2
(45) Date of Patent: Sep. 18, 2018

(54) BASE STATION, MOBILE STATION AND METHOD FOR DOWNLINK SCHEDULING

(71) Applicant: NTT DoCoMo, Inc., Tokyo (JP)

(72) Inventors: Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 81 days.

(21) Appl. No.: 15/057,231

(22) Filed: Mar. 1, 2016

(65) Prior Publication Data

US 2016/0262175 A1    Sep. 8, 2016

(30) Foreign Application Priority Data

Mar. 4, 2015 (CN) .......................... 2015 1 0096589

(51) Int. Cl.
*H04W 72/08* (2009.01)
*H04W 72/12* (2009.01)
*H04L 5/00* (2006.01)

(52) U.S. Cl.
CPC ......... *H04W 72/1289* (2013.01); *H04L 5/003* (2013.01); *H04W 72/1205* (2013.01)

(58) Field of Classification Search
None
See application file for complete search history.

(56) References Cited

U.S. PATENT DOCUMENTS 7,194,041 B2 * 3/2007 Kadous ................ H04L 1/0618
                                                          375/260
9,191,044 B1 * 11/2015 Sun ........................ H04B 7/0413
(Continued)

FOREIGN PATENT DOCUMENTS

WO    WO-2012/148207 A2    11/2012

OTHER PUBLICATIONS

Benjebbour Anass et al: "Concept and practical considerations of non-orthogonal multiple access (NOMA) for future radio access", IEEE International Symposium on Intelligent Signal Processing and Communication Systems, Nov. 12, 2013 (Nov. 12, 2013), pp. 770-774, XP032541968, DOI: 10.1109/ISPACS.2013.6704653 [retrieved on Jan. 6, 2014].

(Continued)

*Primary Examiner* — Gregory Sefcheck
*Assistant Examiner* — Jenkey Van
(74) *Attorney, Agent, or Firm* — Harness, Dickey & Pierce, P.L.C.

(57) ABSTRACT

There are provided a base station, a mobile station and a method for downlink scheduling by the base station. The base station comprises a scheduling unit, configured to assign a downlink resource block and a number of streams, an antenna port, and a scrambling identity for the antenna port to a mobile station, wherein a combination of the number of streams, the antenna port and the scrambling identity determines a successive interference cancellation order of the mobile station in the downlink resource block; and a transmitting unit, configured to transmit downlink scheduling information to the mobile station, the downlink scheduling information including information indicating the downlink resource block and information indicating the number of streams, the antenna port and the scrambling identity.

14 Claims, 3 Drawing Sheets

(56) References Cited

U.S. PATENT DOCUMENTS

| | | | |
|---|---|---|---|
| 2006/0115014 A1* | 6/2006 | Jeong | H04B 7/061 375/267 |
| 2013/0265951 A1* | 10/2013 | Ng | H04W 72/042 370/329 |
| 2014/0153488 A1* | 6/2014 | Koivisto | H04B 1/10 370/328 |
| 2014/0169565 A1 | 6/2014 | Roman et al. | |
| 2016/0173262 A1* | 6/2016 | Davydov | H04W 64/006 370/329 |

OTHER PUBLICATIONS

Benjebbour Anass et al: "System-level performance of downlink NOMA for future LTE enhancements", IEEE Globecom Workshops (GV WKSHPS), Dec. 9, 2013 (Dec. 9, 2013), pp. 66-70, XP032600027, DOI: 10.1109/GLOCOMW.2013.6824963 [retrieved on Jun. 3, 2014].
European Search Report for corresponding application EP16157797, EPO, Munich, (9 pages) dated Jul. 7, 2016.

\* cited by examiner

BASE STATION, MOBILE STATION AND METHOD FOR DOWNLINK SCHEDULING

BACKGROUND

The present disclosure relates to a field of wireless communication, and particularly relates to a base station, a mobile station and a method for downlink scheduling, which may be used in a wireless communication system (for example, a wireless communication system combining Non-Orthogonal Multi-Access (NOMA) with dynamic single-user/multi-user Multiple-Input Multiple-Output (MIMO) for use).

Non-Orthogonal Multi-Access (NOMA) is a wireless access technology proposed in LTE (long-term evolution) release 13 researched in a 3GPP (3rd generation partnership project). In a NOMA system, at a transmitting end, a base station multiplexes data for a plurality of mobile stations at different power levels in each resource block to improve a throughput of a system; at a receiving end, each mobile station demodulates its own data according to its Successive Interference Cancellation (SIC) order, and the SIC order represents a demodulation order of the data, which is multiplexed in each resource block, for respective mobile stations.

In a future 5G technology, to further improve a peak data rate and the throughput of the system, it is proposed a wireless communication system combining NOMA with dynamic Single-User/Multi-User Multiple-Input Multiple-Output (SU/MU MIMO) for use. In this system, the data for the plurality of mobile stations is transmitted by using different power levels in each resource block, and MIMO (SU MIMO or MU MIMO) is independently applied in respective power levels to transmit data for one or more mobile stations.

In a LTE-Advanced communication system, downlink scheduling information (or referred to as a downlink scheduling grant) used for informing a result of downlink scheduling performed by the base station has been defined; however, a downlink scheduling signaling defined in the LTE-Advanced communication system merely supports dynamic SU/MU MIMO instead of NOMA, and thus it is not applicable to the wireless communication system combining the NOMA with the dynamic SU/MU MIMO for use.

SUMMARY

According to one aspect of the present disclosure, there is provided a base station, comprising a scheduling unit, configured to assign a downlink resource block and a number of streams, an antenna port and a scrambling identity for the antenna port to a mobile station, wherein a combination of the number of streams, the antenna port and the scrambling identity determines a successive interference cancellation order of the mobile station in the downlink resource block; a transmitting unit, configured to transmit downlink scheduling information to the mobile station, the downlink scheduling information including information indicating the downlink resource block and information indicating the number of streams, the antenna port and the scrambling identity.

According to another aspect of the present disclosure, there is provided a method for downlink scheduling by a base station, comprising: assigning a downlink resource block and a number of streams, an antenna port and a scrambling identity for the antenna port to a mobile station, wherein a combination of the number of streams, the antenna port and the scrambling identity determines a successive interference cancellation order of the mobile station in the downlink resource block; and transmitting downlink scheduling information to the mobile station, the downlink scheduling information including information indicating the downlink resource block and information indicating the number of streams, the antenna port and the scrambling identity.

According to a further aspect of the present disclosure, there is provided a mobile station, comprising a receiving unit, configured to receive downlink scheduling information transmitted by a base station, the downlink scheduling information including information indicating a downlink resource block assigned to the mobile station and information indicating a number of streams, an antenna port and a scrambling identity for the antenna port, which are assigned to the mobile station; and a determining unit, configured to determine a successive interference cancellation order of the mobile station in the downlink resource block based on a combination of the number of streams, the antenna port and the scrambling identity.

By using the base station, the method for downlink scheduling and the mobile station according to the above aspects of the present disclosure, an SIC order of the mobile station in the downlink resource block may be determined by a combination of the number of streams, the antenna port and the scrambling identity for the antenna port, which are assigned to the mobile station and included in the downlink scheduling information, such that the base station does not need to transmit the SIC order by using a dedicated signaling, which can support the wireless communication system combining NOMA with dynamic SU/MU MIMO for use while increasing signaling overhead as small as possible.

BRIEF DESCRIPTION OF THE DRAWINGS

The foregoing and other objects, features and advantages of the present disclosure will become more apparent from the detailed description of the embodiments of the present disclosure in conjunction with the accompanying drawings, wherein.

DETAILED DESCRIPTION

A wireless communication system, a base station, a mobile station and a method for downlink scheduling according to embodiments of the present disclosure will be described below with reference to accompanying drawings. In the accompanying drawings, like reference numbers always refer to like elements. It should be understood that the embodiments described herein are merely illustrative, and shall not to be construed as limiting a scope of the present disclosure.

Firstly, one example to which a wireless communication system of an embodiment of the present disclosure may be applied is described with reference to FIG. 1, and the wireless communication system combines NOMA with dynamic SU/MU MIMO for use.

Figure 1:
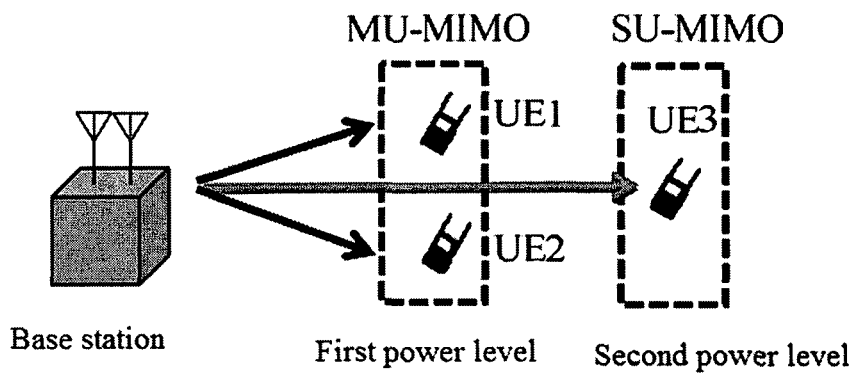
FIG. 1 shows one example to which a wireless communication system combining NOMA with dynamic SU/MU MIMO for use according to an embodiment of the present disclosure can be applied.

The example of the wireless communication system shown in FIG. 1 comprises a base station and a plurality of User Equipments (UEs) in communication with the base station. The base station may be connected with an upper-layer apparatus (not shown), and the upper-layer apparatus may be further connected to a core network (not shown). It should be noted that although FIG. 1 merely shows one base station and three UEs, it is just exemplary, and there may be more or less base stations and UEs as required. In addition, the UEs described herein may comprise various types of user terminals, for example, a mobile terminal (or referred to be as a mobile station) or a fixed terminal. However, for ease of convenience, the UEs and the mobile stations may be sometimes interchangeably used hereinafter.

For each downlink resource block (for example, a frequency resource block), the base station schedules respective UEs, so as to decide data for which UEs is multiplexed into the resource block. For example, the base station may perform the above scheduling according to Channel State Information (CSI), which is fed back from respective UEs, reflecting a wireless channel condition between the UEs and the base station. In the example shown in FIG. 1, the base station may multiplex data for UE1, UE2 and UE3 into a same resource block. In addition, the base station may transmit data for the UE1 and the UE2 at a first power level (or first power) by MU MIMO, and may transmit data for the UE3 at a second power level (or second power) different from the first power level by SU MIMO, wherein the UE1 and the UE2 are, for example, UEs close to the base station or positioned at a center of a cell, and the UE3 is, for example, a UE far away from the base station or positioned on an edge of the cell.

When data signals transmitted by the base station are received, the UE (UE1 or UE2 in the example of FIG. 1) close to the base station is firstly subjected to MIMO detection to demodulate a data signal for the UE (UE3 in the example of FIG. 1) far away from the base station, and is subjected to successive interference cancellation (SIC) to eliminate a data signal for the UE far away from the base station, and remaining data signals are subjected to MIMO detection to demodulate its own data signal. On the other hand, the UE far away from the base station may consider a low-power signal for the UE near the base station as interference, thereby demodulating its data signal by performing MIMO detection.

To enable the UE to perform the above MIMO detection and the successive interference cancellation, the UE needs to know information as follows: information indicating a downlink resource block assigned to the UE (for example, position information of the downlink resource block), information related to a pre-coding matrix for the UE, information related to a Modulating and Coding Scheme (MCS) of data for the UE, information related to a DeModulation Reference signal (DMRS) for the UE (for example, position information of the DMRS), a transmitting power assigned to the UE, an SIC order of the UE in the downlink resource block, and information related to the MCS for a UE (hereinafter referred to be as a pairing UE of the UE), which is multiplexed into a same downlink resource block as that of the UE).

As described above, downlink scheduling information (or referred to as a downlink scheduling grant) used for informing the UE of a result of downlink scheduling has been defined in a LTE-Advanced wireless communication system. For example, downlink scheduling information (format 2C) is defined in a 3GPP technical specification TS36.212 v12.3.0. The downlink scheduling information (format 2C) may comprise the information related to the downlink resource block assigned to the UE, the information related to the pre-coding matrix for the UE, the information related to the MCS of the data for the UE and the information related to the DMRS for the UE, as described above, wherein the information related to the MCS of the data for the UE may carry information of a number of codewords assigned to the UE.

The downlink scheduling information may further comprise a number of streams (that is, a number of layers), an antenna port and a scrambling identity for the antenna port, which are assigned to the UE. Table 1 below shows all possible combinations of the antenna port, the scrambling identity ($n_{SCID}$) and the number of streams, which may be assigned to the UE, in a case of assigning one codeword to the UE and in a case of assigning two codewords to the UE, as defined in the downlink scheduling information (format 2C). Because the number of streams, the antenna port and the scrambling identity are respectively represented by 1 bit, there are 8 possible combinations for each case.

TABLE 1

| One Codeword | | Two Codewords | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

However, a transmitting power assigned to the UE, the SIC order of the UE in the downlink resource block and information related to the MCS of the pairing UE of the UE are not comprised in the downlink scheduling information (format 2C), and thus the wireless communication system combining NOMA with dynamic SU/MU MIMO for use may not be supported.

The embodiment of the present disclosure improves the downlink scheduling information. Hereinafter, the embodiment of the present disclosure will be described with reference to the accompanying drawings.

Firstly, the base station according to the embodiment of the present disclosure will be described with reference to FIG. 2.

Figure 2:
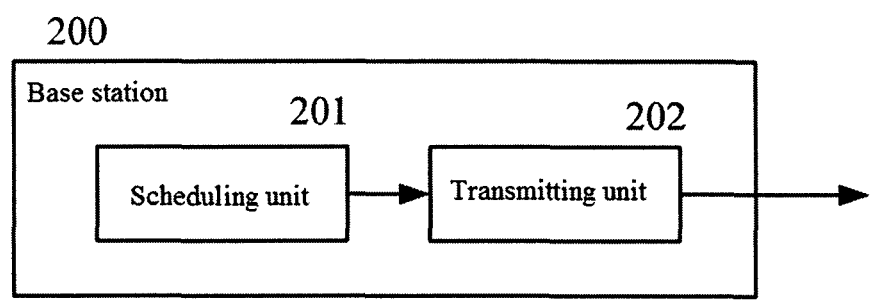
FIG. 2 shows a block diagram of a base station according to an embodiment of the present disclosure.

FIG. 2 shows a block diagram of a base station according to an embodiment of the present disclosure. As shown in FIG. 2, a base station 200 may comprise a scheduling unit 201 and a transmitting unit 202. In addition to the two units, the base station 200 may further comprise other components, for example, a component which may be used to implement communication with a UE and/or an upper-layer apparatus; however, because these components are irrelevant of the content of the embodiment of the present disclosure, illustration and description thereof will be omitted herein.

The scheduling unit 201 may assign a downlink resource block to each UE. Particularly, as described above, for each downlink resource block, the scheduling unit 201 may schedule respective UEs so as to determine data for which UEs is multiplexed into the resource block. To this end, CSI may be fed back to the base station from each UE, such that the scheduling unit 201 may perform the above scheduling according to the CSI fed back by the respective UEs. In addition, based on the CSI fed back from the respective UEs, the scheduling unit 201 may determine demodulation orders (that is, SIC orders of the respective UEs in the resource block) of data, which is multiplexed in each resource block, for the respective UEs and transmitting powers and MCSs which are assigned to the respective UEs. Correspondingly, the scheduling unit 201 may further determine the MCS of its pairing UE for each UE. In addition, the scheduling unit 201 may determine a position of a DMRS for each UE according to the CSI. The scheduling unit 201 performs the above scheduling according to the CSI and a method for determining the SIC order of the UE, the position of the DMRS, the transmitting power and the MCS is well known in the art, and its description will be omitted herein for simplicity.

In the embodiment of the present disclosure, the scheduling unit 201 may assign a number of streams, an antenna port and a scrambling identity for the antenna port to each UE, such that a combination of the number of streams, the antenna port and the scrambling identity which are assigned to the UE can determine an SIC order of the UE in the downlink resource block. In other words, the scheduling unit 201 may assign the number of streams, the antenna port and the scrambling identity according to the SIC order of each UE in the downlink resource block, such that the SIC order of the UE in the downlink resource block may be determined according to the combination of the number of streams, the antenna port and the scrambling identity at the UE.

Particularly, the scheduling unit 201 may assign the number of streams, the antenna port and the scrambling identity to the UE according to a predefined rule (or referred to as a mapping rule). The rule is used to establish a mapping relationship between the combination of the number of streams, the antenna port and the scrambling identity which are assigned to the UE and the SIC order of the UE in the downlink resource block, and may be a rule both known by the base station and the UE. For example, the rule may be predefined, and stored in the base station and the UE. Alternatively, the rule may be defined in the base station, and transmitted to the UE through a semi-static signaling such as a Ratio Resource Control (RRC) signaling, such that the UE acquires the rule. The base station may periodically or aperiodically update the predefined rule, and transmit the updated rule to the UE through the semi-static signaling. Because a transmission period of the semi-static signaling is relatively long, signaling overhead caused by transmitting the rule is relatively low.

In the embodiment of the present disclosure, the rule may include a mapping of all combinations of antenna ports and scrambling identities when the number of streams assigned to the UE is 1 to a corresponding SIC order (that is, the SIC order of the UE in the downlink resource block), and a mapping of all combinations of antenna ports and scrambling identities when the number of streams assigned to the UE is 2 to a corresponding SIC order.

For example, in the wireless communication system combining NOMA with dynamic SU/MU MIMO (2×2) for use, one or two power levels (powers) may be employed to transmit data for the UE, and meanwhile, for each power level, one or two streams may be transmitted, and the streams may be used in a single UE (SU MIMO) or multiple UEs (MU MIMO). Accordingly, in such a system, there may be 9 transmission modes. Correspondingly, the rule may include a mapping capable of mapping the 9 transmission modes to the corresponding SIC order. For ease of convenience, (n, m)+(p, q) is used herein to describe the transmission modes, where n and m respectively represent ranks (the number of streams) of two UEs employing the first power level, and p and q respectively represent ranks of two UEs employing the second power level. It is to be noted that, when there is only one UE for the first power level, the above (n, m) may be simplified to (n'), where n' represents a rank of the UE employing the power level; similarly, when there is only one UE for the second power level, the above (p, q) may be simplified to (p'), where p' represents a rank of the UE employing the power level. Table 2 below shows the 9 transmission modes.

TABLE 2

NOMA + Dynamic SU/MU MIMO (Two Power Levels)

| Two Streams in Total | Three Streams in Total | Four Streams in Total |
| --- | --- | --- |
| (1) + (1) | (1) + (2) | (2) + (2) |
|  | (2) + (1) | (2) + (1, 1) |
|  | (1) + (1, 1) | (1, 1) + (2) |
|  | (1, 1) + (1) | (1, 1) + (1, 1) |

Certainly, in addition to the mapping of all the combinations to the corresponding SIC order, the rule may only include a mapping of part of all the above combinations to the corresponding SIC order.

The rule may be defined in multiple manners. Table 3 below shows a rule defined in a first manner. Each row in Table 3 is used in one stream, that is, the antenna port and the scrambling identity shown in each row may be used in one stream assigned to the UE. It is to be noted that, the SIC order "1 or 2" in a second row of Table 3 refers to that, if a stream corresponding to the row and a stream (its SIC order is 1) corresponding to a former row (a first row) belong to a same UE, an SIC order of the stream corresponding to the second row is identical to that of the first row (being 1); in contrast, if the stream corresponding to the second row and the stream corresponding to the first row belong to different UEs, the SIC order of the stream corresponding to the second row is 2. Similarly, the SIC order "2 or 3" in a fourth row of Table 3 refers to that, if a stream corresponding to the fourth row and a stream (its SIC order is 2) corresponding to a former row (a third row) belong to a same UE, an SIC order of the stream corresponding to the fourth row is identical to that of the third row (being 2); in contrast, if the stream corresponding to the fourth row and the stream corresponding to the former row belong to different UEs, the SIC order of the stream corresponding to the fourth row is 3.

TABLE 3

| Antenna Port | Scrambling Identity | SIC Order |
| --- | --- | --- |
| 7 | 0 | 1 |
| 8 | 0 | 1 or 2 |

TABLE 3-continued

| Antenna Port | Scrambling Identity | SIC Order |
|---|---|---|
| 7 | 1 | 2 |
| 8 | 1 | 2 or 3 |

Hereinafter, a method for determining the number of streams, the antenna port and the scrambling identity, which are assigned to the UE, by the base station according to the rule shown in Table 3 will be described in conjunction with examples shown in FIGS. 3-5.

Figure 3:
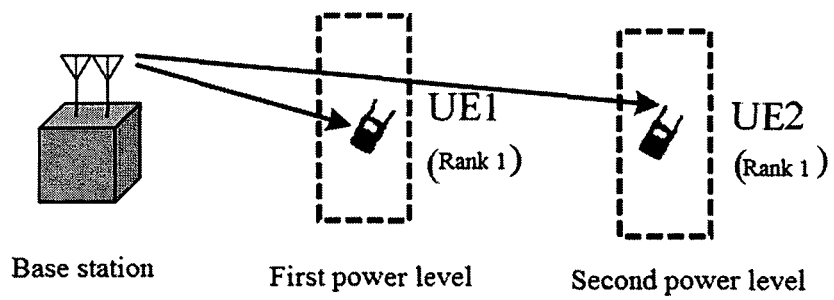
FIG. 3 shows a first example of determining a number of streams, an antenna port and a scrambling identity assigned to UE by a base station according to a predefined rule.

In the example shown in FIG. 3, it is assumed that the base station determines that the SIC order of the UE1 close to the base station is 2 and the SIC order of the UE2 far away from the base station is 1. The base station may respectively assign one stream to the UE1 and the UE2 (that is, ranks of the UE1 and the UE2 both are 1). Then, the base station may determine their corresponding antenna ports and scrambling identities according to the rule shown in Table 3 for the two streams. Specifically, the base station may firstly determine a corresponding antenna port and scrambling identity for one stream assigned to the UE2 far away from the base station. It may be known from Table 3 that, corresponding to the SIC order 1, the antenna port is 7, the scrambling identity is 0, and thus the base station may assign the antenna port 7 and the scrambling identity 0 to the UE2 (particularly, assigned to the stream of the UE2). That is to say, the base station may assign "one stream (or one layer), antenna port 7 and scrambling identity 0" to the UE2. Then, the base station may determine a corresponding antenna port and scrambling identity for one stream assigned to the UE1 close to the base station. It may be known from Table 3 that, corresponding to the SIC order 2, the antenna port is 8, the scrambling identity is 0, and thus the base station may assign the antenna port 8 and the scrambling identity 0 to the UE1. That is to say, the base station may assign "one stream (or one layer), antenna port 8 and scrambling identity 0" to the UE1 (particularly, assigned to the stream of the UE1).

Figure 4:
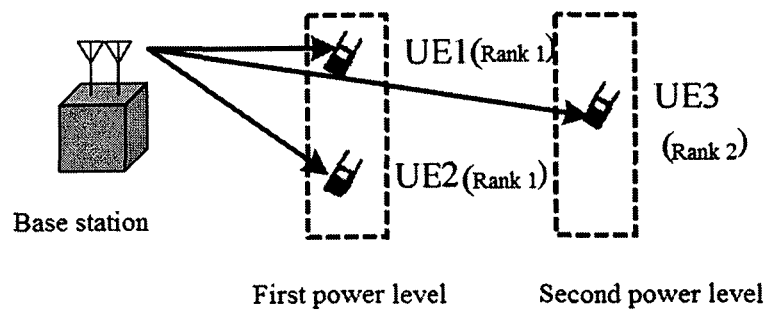
FIG. 4 shows a second example of determining a number of streams, an antenna port and a scrambling identity assigned to UE by a base station according to a predefined rule.

In the example shown in FIG. 4, it is assumed that SIC orders of the UE1 and the UE2 close to the base station are respectively 3 and 2, the SIC order of the UE3 far away from the base station is 1, wherein data for the UE1 and the UE2 is transmitted in a MU MIMO manner. The base station may respectively assign one stream to the UE1 and the UE2 (ranks of the UE1 and the UE2 both are 1), and may assign two streams to the UE3 (a rank of the UE3 is 2). Then, the base station may determine corresponding antenna ports and scrambling identities according to the rule shown in Table 3 for the three streams. Particularly, firstly, the base station may determine corresponding antenna ports and scrambling identities for two streams assigned to the UE3 far away from the base station. Because the two streams are used in the UE3, they have a same SIC order "1". It may be known from Table 3 that, the two streams may correspond to the "antenna port 7, scrambling identity 0" (the first row) and the "antenna port 8, scrambling identity 0" (the second row), and thus the base station may assign the antenna ports 7 and 8 and the scrambling identities 0 to the UE3. That is to say, the base station may assign "two streams (or two layers), antenna ports 7 and 8 and scrambling identities 0" to the UE3. Then, the base station determines corresponding antenna ports and scrambling identities for two streams assigned to the UE1 and the UE2. It may be known from Table 3 that, corresponding to the SIC order 2, the antenna port is 7, the scrambling identity is 1, and corresponding to the SIC order 3, the antenna port is 8, the scrambling identity is 1, and thus the base station may assign the antenna port 7 and the scrambling identity 1 to the UE2 and may assign the antenna port 8 and the scrambling identity 1 to the UE1. That is to say, the base station may assign "one stream (or one layer), antenna port 7 and scrambling identity 1" to the UE2 and may assign "one stream (or one layer), antenna port 8 and scrambling identity 1" to the UE1.

Figure 5:
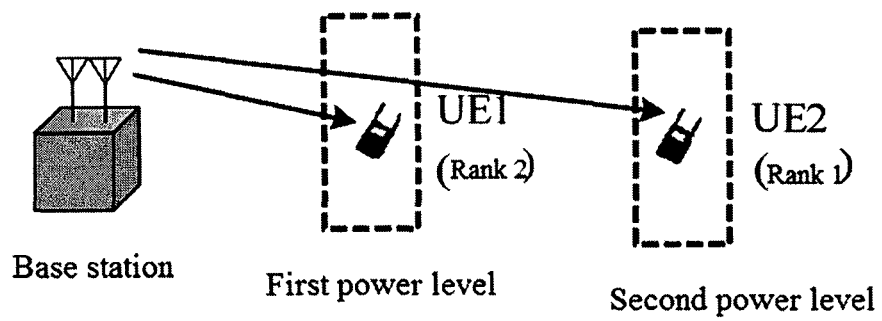
FIG. 5 shows a third example of determining a number of streams, an antenna port and a scrambling identity assigned to UE by a base station according to a predefined rule.

In the example shown in FIG. 5, it is assumed that the SIC order of the UE1 close to the base station is 2, and the SIC order of the UE2 far away from the base station is 1. The base station may assign two streams to the UE1 (a rank of the UE1 is 2), and may assign one stream to the UE2 (a rank of the UE2 is 1). Then, the base station may determine their corresponding antenna ports and scrambling identities according to the rule shown in Table 3 for the three streams. Particularly, firstly, the base station may determine corresponding antenna port and scrambling identity for one stream assigned to the UE2 far away from the base station. In accordance with a manner similar to FIG. 3, the base station may assign "one stream (or one layer), antenna port 7 and scrambling identity 1" to the UE2. Then, the base station may determine corresponding antenna ports and scrambling identities for two streams assigned to the UE1 close to the base station. It may be known from Table 3 that, the SIC order 2 may correspond to the "antenna port 8, scrambling identity 0" (the second row) and the "antenna port 7, scrambling identity 1" (the third row), and thus the base station may assign the antenna port 8 and the scrambling identity 0, and the antenna port 7 and the scrambling identity 1 to the UE1. That is to say, the base station may assign "two streams (or two layers), antenna port 8 and scrambling identity 0, and antenna port 7 and scrambling identity 1" to the UE1. It is to be noted that in the example shown in FIG. 5, between the two streams assigned to the UE1, the antenna ports are different (7 and 8), and the scrambling identities are also different (0 and 1), which is incompatible with the downlink scheduling information (format 2C) shown in Table 1, because in Table 1, between the two streams assigned to the same UE, only the scrambling identities are different, and the antenna ports are same.

In addition to the rule defined in the first manner described above, the rule may be further defined in a second manner, which is shown in Table 4 below.

TABLE 4

| Antenna Port | Scrambling Identity | SIC Order |
|---|---|---|
| 7 | 0 | 1 |
| 7 | 1 | 1 or 2 |
| 8 | 0 | 2 |
| 8 | 1 | 2 or 3 |

The base station may assign the number of streams, the antenna port and the scrambling identity to the UE according to Table 4 in a manner similar to the manner described above with reference to Table 3, such that the UE may determine the SIC order according to the number of streams, the antenna port and the scrambling identity, which will not be repeated herein.

It should be noted that among respective items (rows) of the rule shown in the above Table 3, the antenna ports are changed prior to the scrambling identities, that is, the antenna ports are firstly changed, and then the scrambling identities are changed. Among respective items (respective rows) of the rule shown in the above Table 4, the scrambling identities are changed prior to the antenna ports, that is, the scrambling identities are firstly changed, and then the antenna ports are changed. By observing combinations of the number of streams, the antenna ports and the scrambling identities specified in the downlink scheduling information (format 2C) defined in the LTE-Advanced system shown in Table 1, it is found that, in a case of assigning two streams to the UE, the combination specified in the downlink scheduling information (format 2C) may also be that the antenna port is changed prior to the scrambling identity. Therefore, as compared with the rule shown in Table 4, the rule shown in Table 3 is changed a little in the downlink scheduling information (format 2C) defined in the LTE-Advanced system. From a perspective of changing the existing downlink scheduling information as small as possible, the rule shown in Table 3 may be preferably used. Certainly, in addition to the rules shown in FIG. 3 and FIG. 4, other forms of rules may also be used.

Returning to FIG. 2, the transmitting unit 202 may transmit the downlink scheduling information to the UE, so as to inform the UE of a scheduling result of the base station (particularly, the scheduling unit 201).

The downlink scheduling information may include the information indicating the downlink resource block and the information indicating the number of streams, the antenna port and the scrambling identity, as described above. Particularly, in a case where the combination of the number of streams, the antenna port and the scrambling identity which are assigned to the UE by the base station is compatible with the combination of the number of streams, the antenna port and the scrambling identity which are specified in the above downlink scheduling information (2C), the downlink scheduling information transmitted by the transmitting unit 202 may employ a format identical to that of the downlink scheduling information (format 2C), to use the existing downlink scheduling information to a greatest extent so as to avoid increasing new signaling overhead. Certainly, the base station may also transmit the downlink scheduling information by employing other formats except the format 2C. On the other hand, if the combination of the number of streams, the antenna port and the scrambling identity which are assigned to the UE by the base station is incompatible with the combination of the number of streams, the antenna port and the scrambling identity which are specified in the above downlink scheduling information (2C), the transmitting unit 202 may transmit the downlink scheduling information by employing any other format, provided that the downlink scheduling information includes the information indicating the downlink resource block and the information indicating the number of streams, the antenna port and the scrambling identity.

In addition to the above information, the downlink scheduling information transmitted by the transmitting unit 202 may further include at least one of the information related to the pre-coding matrix for the UE, the information related to the MCS for the UE, and the information related to the DMRS for the UE, which are described above.

In addition, the transmitting unit 202 may transmit the information related to the MCS of the pairing UE of the UE to the UE through a dedicated signaling. The dedicated signaling may be in any suitable form as required.

In addition, the transmitting unit 202 may further transmit a DeModulation Reference Signal (DMRS) to the UE, such that the UE can determine a transmitting power assigned to the UE according to a power of the DMRS. Particularly, the transmitting unit 202 may use a ratio of the transmitting power assigned to the UE to a total transmitting power for respective UEs as a ratio of the transmitting power of the DMRS for the UE to the total transmitting power of the DMRS for the respective UEs, so as to determine the transmitting power of the DMRS for the UE, and then transmit the DMRS at the transmitting power.

In this way, the base station according to the embodiment of the present disclosure can perform a downlink scheduling, and informs the UE of a result of downlink scheduling by downlink scheduling information and/or other information. Because the SIC order of the UE in the downlink resource block is informed implicitly by the combination of the number of streams, the antenna port and the scrambling identity which are assigned to the UE, and the transmitting power assigned to the UE is implicitly informed, an additional signaling is not required to inform the two kinds of information, thus avoiding increase of the signaling overhead as much as possible. In addition, in some cases, the downlink scheduling information may employ a format of the downlink scheduling information (format 2C) defined in an existing system, such that the existing system is changed as small as possible.

Hereinafter, a mobile station according to an embodiment of the present disclosure will be described with reference to FIG. 6.

Figure 6:
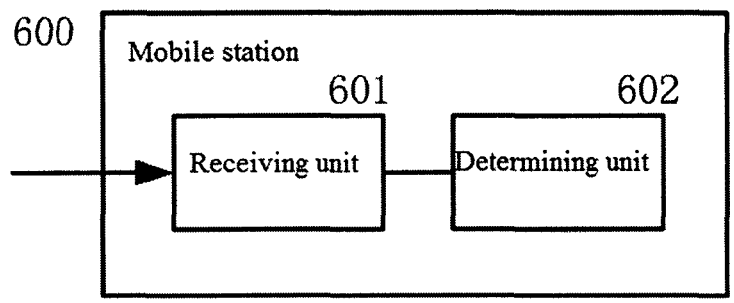
FIG. 6 shows a block diagram of a mobile station according to an embodiment of the present disclosure.

FIG. 6 shows a block diagram of the mobile station. As shown in FIG. 6, a mobile station 600 may comprise a receiving unit 601 and a determining unit 602. In addition to the two units, the mobile station 600 may further comprise other components, for example, those components which may be used to realize communication with the base station; however, because those components are irrelevant of the content of the embodiment of the present disclosure, illustration and description thereof will be omitted herein.

The receiving unit 601 receives downlink scheduling information transmitted by a base station. As described above, the downlink scheduling information includes information (position information of a resource library) indicating a downlink resource block assigned to the mobile station and information indicating a number of streams, an antenna port and a scrambling identity for the antenna port, which are assigned to the mobile station. In addition, the downlink scheduling information may further include at least one of information related to a pre-coding matrix for the mobile station, information related to a MCS for the mobile station, and information (position information of a DMRS) related to the DMRS for the mobile station.

In a case of transmitting the rule described above by using a semi-static signaling such as a RRC signaling by the base station, the receiving unit 601 may further receive the rule through the semi-static signaling. In addition, the receiving unit 601 may receive information related to a MCS of a pairing mobile station of the mobile station and transmitted by the base station, through the dedicated signaling described above.

In addition, the receiving unit 601 may further receive a DeModulation Reference Signal (DMRS) transmitted by the base station. For example, the receiving unit 601 may receive the DMRS according to the information related to the DMRS for the mobile station. Then, the receiving unit 601 may measure a receiving power of the DMRS directly or by a power measuring unit (not shown), and informs the determining unit 602 of it.

The determining unit 602 may determine a result of downlink scheduling performed by the base station according to various information received by the receiving unit 601.

Particularly, the determining unit 602 may determine an SIC order of the mobile station in a downlink resource block based on a combination of the number of streams, the antenna port and the scrambling identity which are assigned to the UE and included in the downlink scheduling information. In the embodiment of the present disclosure, the determining unit 602 may determine the SIC order based on the combination of the number of streams, the antenna port and the scrambling identity according to the rule both known by the base station and the mobile station. As described above, the rule may comprise a mapping of all combinations of the antenna port and the scrambling identity when the number of streams is 1 to a corresponding SIC order, and a mapping of all combinations of the antenna port and the scrambling identity when the number of streams is 2 to a corresponding SIC order. Alternatively, the rule may only include a mapping of part of all the above combinations to the SIC order. For example, in the example shown in FIG. 3, for the UE2, when it is detected that the combination of the number of streams, the antenna port and the scrambling identity which are included in the downlink scheduling information is "one stream (or one layer), antenna port 7 and scrambling identity 0", the determining unit 602 may determine that the SIC order of the UE2 is 1 according to the rule shown in Table 3. For the UE1, when it is detected that the combination of the number of streams, the antenna port and the scrambling identity which are included in the downlink scheduling information is "one stream (or one layer), antenna port 8 and scrambling identity 0", the determining unit 602 may determine that the SIC order of the UE1 is 2 according to the rule shown in Table 3. In the example shown in FIG. 4, for the UE3, when "two streams (or two layers), antenna ports 7 and 8 and scrambling identities 0" is detected, the determining unit 602 may determine that the SIC order of the UE3 is 1 according to the rule shown in Table 3. Similarly, for the UE2 and the UE1, the determining unit 602 may determine that their SIC orders are respectively 2 and 3 according to the rule shown in Table 3. Similarly, in the example shown in the FIG. 5, for the UE2, when "one stream (or one layer), antenna port 7 and scrambling identity 0" is detected, the determining unit 602 may determine that the SIC order of the UE2 is 1. For the UE1, when "two streams (or two layer), antenna port 8 and scrambling identity 0, and antenna port 7 and scrambling identity 1" is detected, the determining unit 602 may determine that the SIC order of the UE1 is 2.

The determining unit 602 may further determine a position of the downlink resource block assigned to the mobile station based on the information indicating the downlink resource block. In addition, the determining unit 602 may further determine the pre-coding matrix, the MCS and/or a position of a DMRS for the mobile station (this position may be provided to the receiving unit 601 so as to receive the DMRS) according to the information related to the pre-coding matrix for the mobile station, the information related to the MCS for the mobile station, and/or the information related to the DMRS for the mobile station. The determining unit 602 may further determine the MCS of the pairing mobile station according to the information, which is received by the receiving unit 601, related to the MCS of the pairing mobile station of the mobile station. A specific method for determining the above information by the determining unit 602 is well known in the art, and its description will be omitted herein for simplicity.

In addition, the determining unit 602 may further determine a transmitting power assigned to the mobile station according to the receiving power of the DMRS, which is provided by the receiving unit 601. For example, the determining unit 602 may use a ratio of the power of the DMRS to a total power of the DMRS for respective mobile stations as a ratio of the transmitting power assigned to the mobile station to the total transmitting power for respective mobile stations, so as to determine the transmitting power assigned to the mobile station.

After the above information reflecting a scheduling result of the base station is determined, the mobile station may use the information to receive and demodulate user data, thereby realizing communication with the base station.

Figure 7:
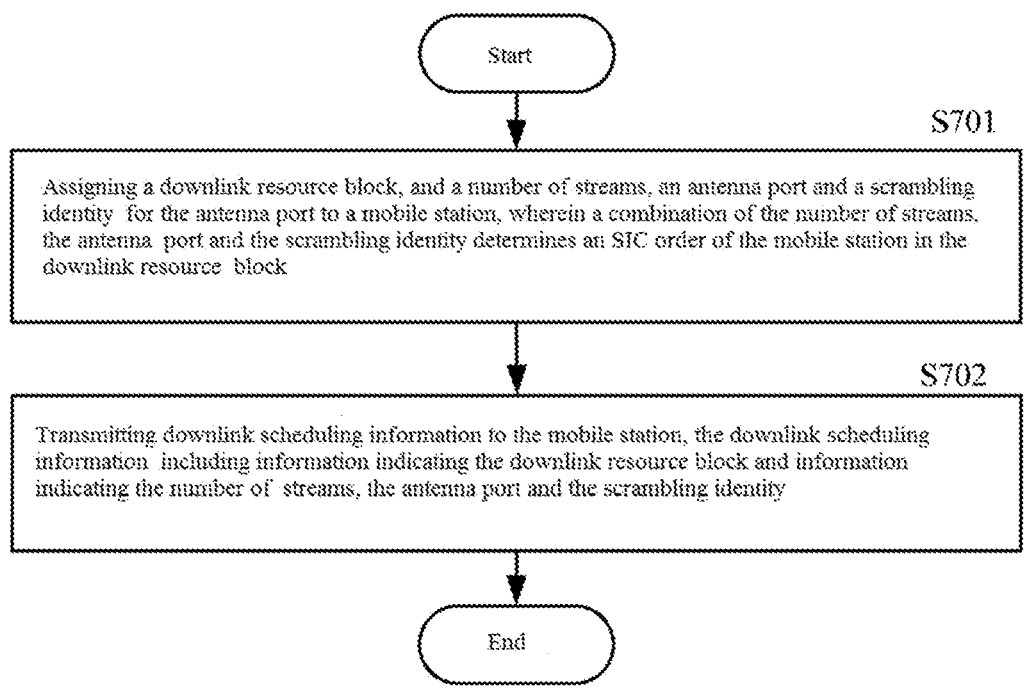
FIG. 7 shows a flow chart of a method for downlink scheduling performed by a base station according to an embodiment of the present disclosure.

Hereinafter, a method for downlink scheduling by the base station according to an embodiment of the present disclosure will be described with reference to FIG. 7. FIG. 7 shows a flow chart of the method for downlink scheduling.

As shown in FIG. 7, in step S701, a downlink resource block may be assigned to a UE, and a number of streams, an antenna port and a scrambling identity for the antenna port may be assigned to the UE, such that a combination of the number of streams, the antenna port and the scrambling identity which are assigned to the UE can determine an SIC order of the UE in the downlink resource block.

Particularly, for each downlink resource block, the base station may schedule respective UEs in the manner described above so as to determine data for which UEs is multiplexed into the resource block, that is, determine the downlink resource block assigned to each UE. The base station may further determine a demodulation order (that is, the SIC orders of respective UEs in the resource block) of data, which is multiplexed in each resource block, for the respective UEs, transmitting powers and MCSs assigned to the respective UEs, MCS of a pairing UE of each UE, as well as a position of a DMRS for each UE in the manner described above.

In the embodiment of the present disclosure, the base station may assign the number of streams, the antenna port and the scrambling identity for the antenna port to each UE, such that the combination of the number of streams, the antenna port and the scrambling identity assigned to the UE can determine the SIC order of the UE in the downlink resource block. In other words, the scheduling unit 201 may assign the number of streams, the antenna port and the scrambling identity to the UE according to the SIC order of each UE in the downlink resource block, such that the SIC order of the UE in the downlink resource block may be determined according to the combination of the number of streams, the antenna port and the scrambling identity at the UE.

Particularly, the base station may assign the number of streams, the antenna port and the scrambling identity to the UE according to the predefined rule as described above. The rule is used to establish a mapping relationship between the combination of the number of streams, the antenna port and the scrambling identity which are assigned to the UE and the SIC order of the UE in the downlink resource block, and may be a rule both known by the base station and the UE. The rule may be predefined and stored in the base station and the UE. Alternatively, the rule may be defined in the base station, and transmitted to the UE through a semi-static signaling such as a Radio Resource Control (RRC) signaling, such that the UE acquires the rule. The base station may further periodically or aperiodically update the predefined rule, and transmit the updated rule to the UE through the semi-static signaling.

More particularly, the rule may include a mapping of all combinations of the antenna port and the scrambling identity when the number of streams assigned to the UE is 1 to a corresponding SIC order (that is, the SIC order of the UE in the downlink resource block), and a mapping of all combinations of the antenna port and the scrambling identity when the number of streams assigned to the UE is 2 to a corresponding SIC order. All the combinations are, for example, combinations corresponding to the 9 transmitting modes described above. Certainly, the rule may only include a mapping of part of all the above combinations to the corresponding SIC order.

The rule may be defined in multiple manners. For example, the rule shown in the above Table 3 or the above Table 4 may be defined, or other forms of rules may be defined as required. Because the rule is identical to the rules described with reference to Table 3, Table 4 and FIGS. 3-5 above, and the base station may assign the number of streams, the antenna port and the scrambling identity to the UE according to the rule in the manner similar to the manner described above, and thus their detailed description will be omitted herein.

With further reference to FIG. 7, in step S702, the downlink scheduling information may be transmitted to the UE, so as to inform the UE of a result of downlink scheduling performed by the base station.

The downlink scheduling information may include the information indicating the downlink resource block and the information indicating the number of streams, the antenna port and the scrambling identity, as described above. In a case where the combination of the number of streams, the antenna port and the scrambling identity which are assigned to the UE by the base station is compatible with the combination of the number of streams, the antenna port and the scrambling identity which are specified in the downlink scheduling information (2C) described above, the downlink scheduling information may employ a format identical to that of the downlink scheduling information (format 2C). Certainly, the downlink scheduling information may also employ other formats except the format 2C. On the other hand, if the combination of the number of streams, the antenna port and the scrambling identity which are assigned to the UE by the base station is incompatible with the combinations of the number of streams, the antenna port and the scrambling identity which are specified in the downlink scheduling information (2C) described above, the downlink scheduling information may be transmitted in any other format, provided that the downlink scheduling information includes the information indicating the downlink resource block and the information indicating the number of streams, the antenna port and the scrambling identity.

In addition to the above information, the downlink scheduling information transmitted in step S702 may further include at least one of the information related to the pre-coding matrix for the UE, the information related to the MCS for the UE, and the information related to the DMRS for the UE, as described above.

In addition, the base station may further transmit the information related to the MCS of the pairing UE of the UE to the UE through a dedicated signaling. The dedicated signal may be in any suitable form as required.

In addition, the base station may transmit the DMRS to the UE, such that the UE can determine a transmitting power assigned to the UE according to the power of the DMRS. In such a case, the base station may determine the transmitting power of the DMRS in the manner described above, and transmit the DMRS at the transmitting power.

In this way, by using the method of downlink scheduling, the downlink scheduling may be performed and the UE is informed of the result of downlink scheduling by the downlink scheduling information and/or other information. Because the UE is implicitly informed of the SIC order of the UE in the downlink resource block and the transmitting power assigned to the UE, an additional signaling is not required to inform the two parameters, so as to avoid increasing signaling overhead. In addition, in some cases, the downlink scheduling information may employ a format of the downlink scheduling information (format 2C) defined in an existing system, such that the existing system is changed as small as possible.

Hereinafter, a flow chart of a method for obtaining the result of downlink scheduling performed by the mobile station according to an embodiment of the present disclosure will be described with reference to FIG. 8.

Figure 8:
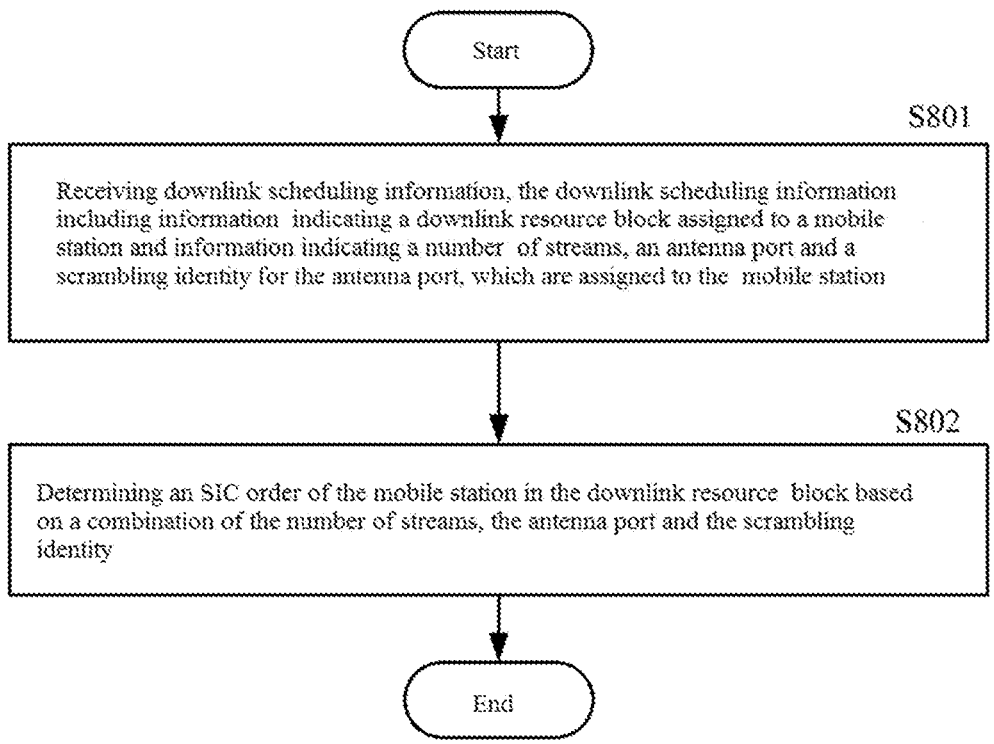
FIG. 8 shows a flow chart of a method for obtaining a result of downlink scheduling performed by a mobile station according to an embodiment of the present disclosure.

As shown in FIG. 8, in step S801, downlink scheduling information transmitted by a base station may be received. As described above, the downlink scheduling information may include information indicating a downlink resource block assigned to a mobile station and information indicating a number of streams, an antenna port and a scrambling identity for the antenna port, which are assigned to the UE. The downlink scheduling information may further include at least one of information related to a pre-coding matrix for the mobile station, information related to a MCS for the mobile station, and information related to a DMRS for the mobile station.

In a case where the base station transmits a rule used for determining a mapping of a combination of the number of streams, the antenna port and the scrambling identity to a SIC order of the mobile station through a semi-static signaling such as a RRC signaling, the mobile station may further receive the rule by receiving the semi-static signaling. In addition, the mobile station may receive the information, which is related to a MCS of a pairing mobile station of the mobile station and transmitted by the base station, through the dedicated signaling described above. The mobile station may further receive the DMRS transmitted by the base station, and may measure a receiving power of the DMRS for a subsequent operation.

In step S802, the mobile station may determine the SIC order of the mobile station in the downlink resource block based on the combination of the number of streams, the antenna port and the scrambling identity which are assigned to the UE and included in the downlink scheduling information. In the embodiment of the present disclosure, the mobile station may determine the SIC order based on the combination of the number of streams, the antenna port and the scrambling identity according to the rule both known by the base station and the mobile station, as described above. Because the rule and the manner of determining the SIC order by the mobile station according to the rule are identical to those described above with reference FIG. 6, and thus descriptions thereof will be omitted herein for simplicity.

The mobile station may determine a position of the downlink resource block assigned to the mobile station based on the information indicating the downlink resource block. In addition, the mobile station may determine the pre-coding matrix, the MCS and a position (which can be used to receive the DMRS) of the DMRS for the mobile station according to the information related to the pre-coding matrix for the mobile station, the information related to the MCS for the mobile station, and/or the information related to the DMRS for the mobile station, which are included in the downlink scheduling information. In addition, the mobile station may determine the MCS of the pairing mobile station according to the information related to the MCS of the pairing mobile station of the mobile station. A specific method for determining the above information by the mobile station is well known in the art, and its description will be omitted for simplicity.

In addition, the mobile station may further determine the transmitting power assigned to the mobile station according to the received power of the DMRS. For example, the mobile station may determine the transmitting power assigned to the mobile station in the manner described above, which will not be repeated here.

By adopting the above method, in the wireless communication system combining NOMA with dynamic SU/MU MIMO for use, the mobile station may acquire a result of downlink scheduling performed by the base station, so as to implement communication with the base station according to the acquired information.

By utilizing the above base station, the mobile station and respective methods according to the embodiment of the present disclosure, the mobile station may be implicitly informed of its SIC order through the combination of the number of streams, the antenna port and the scrambling identity for the antenna port, which are assigned to the mobile station and included in the downlink scheduling information. In addition, the mobile station is implicitly informed of the transmitting power assigned to it by the power of the DMRS. In this way, the base station informs the SIC order and the transmitting power without using a dedicated signaling, thereby supporting the wireless communication system combining NOMA with dynamic SU/MU MIMO for use in a case of increasing signaling overhead as small as possible. Meanwhile, in some cases, existing downlink scheduling information may be used to transmit some information, so that a signaling in an existing wireless communication system is changed as small as possible.

Although the exemplary embodiments of the present disclosure have been shown and described, it will be understood by those skilled in the art that changes in various forms and details may be made in these exemplary embodiments without departing from the spirit and scope of the present disclosure as defined by the appended claims and equivalents thereof.

The invention claimed is:

1. A base station, comprising:
a processor, configured to assign a downlink resource block and a number of streams, an antenna port and a scrambling identity for the antenna port to a mobile station, wherein a combination of the number of streams, the antenna port and the scrambling identity determines a successive interference cancellation order of the mobile station in the downlink resource block; and
a transmitting unit, configured to transmit downlink scheduling information to the mobile station, the downlink scheduling information including information indicating the downlink resource block and information indicating the number of streams, the antenna port and the scrambling identity,
wherein the processor assigns the number of streams, the antenna port and the scrambling identity according to a rule both known by the base station and the mobile station; and
the rule includes a mapping of all combinations of antenna ports and scrambling identities when the number of streams is 1 to a corresponding successive interference cancellation order, and a mapping of all combinations of antenna ports and scrambling identities when the number of streams is 2 to a corresponding successive interference cancellation order;
wherein the mobile station performs successive interference cancellation based on the downlink scheduling information.

2. The base station according to claim 1, wherein the transmitting unit is further configured to inform the mobile station of the rule through a radio resource control signaling.

3. The base station according to claim 1, wherein the downlink scheduling information further includes at least one of information related to a pre-coding matrix for the mobile station, information related to a modulating and coding scheme for the mobile station, and information related to a demodulation reference signal for the mobile station.

4. The base station according to claim 3, wherein the transmitting unit is further configured to transmit information related to a modulating and coding scheme of another mobile station and multiplexed into a resource block identical to that of the mobile station to the mobile station through a dedicated signaling.

5. The base station according to claim 3, wherein the transmitting unit is further configured to transmit a demodulation reference signal to the mobile station, such that the mobile station determines a transmitting power assigned to the mobile station based on a power of the demodulation reference signal.

6. A method for downlink scheduling by a base station, comprising:
assigning a downlink resource block and a number of streams, an antenna port and a scrambling identity for the antenna port to a mobile station, wherein a combination of the number of streams, the antenna port and the scrambling identity determines a successive interference cancellation order of the mobile station in the downlink resource block; and
transmitting downlink scheduling information to the mobile station, the downlink scheduling information including information indicating the downlink resource block and information indicating the number of streams, the antenna port and the scrambling identity,
wherein the number of streams, the antenna port and the scrambling identity are assigned according to a rule both known by the base station and the mobile station; and
the rule includes a mapping of all combinations of antenna ports and scrambling identities when the number of streams is 1 to a corresponding successive interference cancellation order, and a mapping of all combinations of antenna ports and scrambling identities when the number of streams is 2 to a corresponding successive interference cancellation order;
wherein the mobile station performs successive interference cancellation based on the downlink scheduling information.

7. The method according to claim 6, further comprising: informing the mobile station of the rule through a radio resource control signaling.

8. The method according to claim 6, wherein the downlink scheduling information further includes at least one of information related to a pre-coding matrix for the mobile station, information related to a modulating and coding scheme for the mobile station, and information related to a demodulation reference signal for the mobile station.

9. The method according to claim 8, further comprising: transmitting information related to a modulating and coding scheme of another mobile station and multiplexed into a resource block identical to that of the mobile station to the mobile station through a dedicated signaling.

10. The method according to claim 8, further comprising: transmitting a demodulation reference signal to the mobile station, such that the mobile station determines a transmitting power assigned to the mobile station based on a power of the demodulation reference signal.

11. A mobile station, comprising:
a receiving unit, configured to receive downlink scheduling information transmitted by a base station, the downlink scheduling information including information indicating a downlink resource block assigned to the mobile station and information indicating a number of streams, an antenna port and a scrambling identity for the antenna port, which are assigned to the mobile station; and
a processor, configured to determine a successive interference cancellation order of the mobile station in the downlink resource block based on a combination of the number of streams, the antenna port and the scrambling identity,
wherein the processor is configured to determine a successive interference cancellation order of the mobile station in the downlink resource block according to a rule both known by the base station and the mobile station, based on a combination of the number of streams, the antenna port and the scrambling identity; and
the rule includes a mapping of all combinations of antenna ports and scrambling identities when the number of streams is 1 to a corresponding successive interference cancellation order, and a mapping of all combinations of antenna ports and scrambling identities when the number of streams is 2 to a corresponding successive interference cancellation order;
wherein the mobile station performs successive interference cancellation based on the downlink scheduling information.

12. The mobile station according to claim 11, wherein the receiving unit is further configured to receive the rule informed by the base station through a radio resource control signaling.

13. The mobile station according to claim 11, wherein the downlink scheduling information further includes at least one of information related to a pre-coding matrix for the mobile station, information related to a modulating and coding scheme for the mobile station, and information related to a demodulation reference signal for the mobile station.

14. The mobile station according to claim 13, wherein the receiving unit is further configured to receive information, which is transmitted by the base station, related to a modulating and coding scheme of another mobile station and multiplexed into a resource block identical to that of the mobile station to the mobile station through a dedicated signaling.

\* \* \* \* \*